(12) United States Patent
Victor et al.

(10) Patent No.: US 10,439,232 B2
(45) Date of Patent: Oct. 8, 2019

(54) SELECTIVELY SEALING FUEL CELL POROUS PLATE

(75) Inventors: Stephen P. Victor, Guilford, CT (US); Thomas H. Madden, Glastonbury, CT (US); David A. Niezelski, Manchester, CT (US); Kristoffer Ridgeway, Simsbury, CT (US)

(73) Assignee: AUDI AG, Ingolstadt (DE)

( * ) Notice: Subject to any disclaimer, the term of this patent is extended or adjusted under 35 U.S.C. 154(b) by 1322 days.

(21) Appl. No.: 13/258,778

(22) PCT Filed: Apr. 6, 2009

(86) PCT No.: PCT/US2009/039584
§ 371 (c)(1),
(2), (4) Date: Sep. 22, 2011

(87) PCT Pub. No.: WO2010/117353
PCT Pub. Date: Oct. 14, 2010

(65) Prior Publication Data
US 2012/0009500 A1    Jan. 12, 2012

(51) Int. Cl.
*H01M 8/023* (2016.01)
*H01M 8/0213* (2016.01)
(Continued)

(52) U.S. Cl.
CPC ........... *H01M 8/023* (2013.01); *H01M 8/028* (2013.01); *H01M 8/0213* (2013.01);
(Continued)

(58) Field of Classification Search
CPC .............. H01M 8/0213; H01M 8/023; H01M 8/04291; H01M 8/028; H01M 8/0228;
(Continued)

(56) References Cited

U.S. PATENT DOCUMENTS

| 5,523,175 A | 6/1996 | Beal et al. |
| 6,350,540 B1 * | 2/2002 | Sugita ................ H01M 8/023 429/505 |

(Continued)

FOREIGN PATENT DOCUMENTS

| EP | 1 231 655 A1 | 8/2002 | |
| JP | WO 2006106908 A1 * | 10/2006 | .......... H01M 8/0273 |

(Continued)

OTHER PUBLICATIONS

Notification Concerning Transmittal of International Preliminary Report on Patentability (Chapter 1 of the Patent Cooperation Treaty) dated Oct. 20, 2011 for PCT/US2009/039584.
International Search Report and Written Opinion of the International Searching Authority for International application No. PCT/US2009/039584 dated Jan. 7, 2010.

*Primary Examiner* — Sarah A. Slifka
*Assistant Examiner* — Lilia Nedialkova
(74) *Attorney, Agent, or Firm* — Seed IP Law Group LLP

(57) ABSTRACT

A method of manufacturing a porous structure for a fuel cell is disclosed. The method includes providing the porous structure, and processing the porous structure to selectively produce a non-porous region on the porous structure. In one example, the non-porous region is provided at the perimeter of the porous structure, an edge of an internal manifold and/or a surface or recess that supports a seal or gasket. The non-porous region has a porosity that is less than the porosity of the porous structure. The non-porous region prevents undesired leakage of fluid from the porous structure and prevents migration of adhesive associated with the seals.

20 Claims, 1 Drawing Sheet

(51) Int. Cl.
*H01M 8/0228* (2016.01)
*H01M 8/0286* (2016.01)
*H01M 8/0273* (2016.01)
*H01M 8/028* (2016.01)
*H01M 8/04291* (2016.01)
*H01M 8/1018* (2016.01)

(52) U.S. Cl.
CPC ....... *H01M 8/0228* (2013.01); *H01M 8/0273* (2013.01); *H01M 8/0286* (2013.01); *H01M 8/04291* (2013.01); *H01M 2008/1095* (2013.01); *Y02P 70/56* (2015.11)

(58) Field of Classification Search
CPC ............. H01M 8/0286; H01M 8/0273; H01M 8/1095; H01M 8/0206; H01M 8/0267; H01M 8/0243; H01M 8/021; H01M 8/0234; H01M 8/0254; H01M 8/0239; H01M 2008/1095; Y02E 60/50; Y02P 70/56
USPC .......................... 429/457, 512–514; 427/115
See application file for complete search history.

(56) References Cited

U.S. PATENT DOCUMENTS

| | | | |
|---|---|---|---|
| 2002/0006539 | A1 | 1/2002 | Kubota et al. |
| 2003/0152821 | A1 | 8/2003 | Lisi et al. |
| 2004/0131916 | A1 | 7/2004 | Hodge et al. |
| 2004/0137303 | A1* | 7/2004 | Kuroki ................ H01M 8/0271 429/509 |
| 2007/0190401 | A1 | 8/2007 | Ueda et al. |
| 2008/0044715 | A1 | 2/2008 | Vyas et al. |
| 2008/0241641 | A1* | 10/2008 | Kurita ................... B32B 37/144 429/434 |
| 2009/0136811 | A1* | 5/2009 | Kusakabe ........... H01M 8/0273 429/492 |
| 2009/0214926 | A1* | 8/2009 | Watanabe et al. .............. 429/34 |
| 2010/0003568 | A1* | 1/2010 | Sugawara ............... H01M 8/02 429/481 |

FOREIGN PATENT DOCUMENTS

| | | | | |
|---|---|---|---|---|
| JP | WO 2008013303 A1 * | 1/2008 | .............. | H01M 8/02 |
| WO | WO 2006135108 A1 * | 12/2006 | | |

* cited by examiner

SELECTIVELY SEALING FUEL CELL POROUS PLATE

BACKGROUND

This disclosure relates to sealing components of a fuel cell stack assembly, which includes an anode, a cathode and an electrode assembly.

A fuel cell typically includes dozens or more cells arranged to provide the cell stack assembly. Each cell includes an anode, a cathode and an electrode assembly. In one type of fuel cell, the anode and the cathode are provided by porous plates having flow fields that respectively supply fuel and reactant to the electrode assembly. Porous plates can be used to transport water, which can also be utilized as coolant. For some fuel cells it is desirable to use internal manifolds, which are located inside an outer perimeter of the porous plates. The internal manifolds carry a fluid flow, such as fuel, reactant and/or coolant. The flow through the internal manifolds must be contained in some manner to prevent overboard leakage from the cell stack assembly.

Traditional fuel cell stack assembly designs use interfacial seals between the components of the cell stack assembly. The interfacial seals are arranged between the lateral sides of the anode, the cathode and the electrode assembly to prevent the fuel and reactant from escaping their respective flow fields thereby bypassing the electrode assembly and intermixing undesirably with one another. One type of interfacial seal is provided by a gasket having adhesive that is applied to the face of the porous plate. The adhesive can migrate into the porous plate and enter the flow field, for example, which can contaminate coolant within the cell stack assembly.

SUMMARY

This disclosure relates to a method of manufacturing a porous structure, such as a water transport plate, for a fuel cell. The method includes providing the porous structure, and processing the porous structure to selectively produce a non-porous region on the porous structure and seal a portion of the plate. In one example, the non-porous region is provided at the perimeter of the porous structure, an edge of an internal manifold and/or a surface or recess that supports a seal or gasket. The non-porous region has a porosity that is less than the porosity of the porous structure. The non-porous region prevents undesired leakage of fluid from the porous structure and prevents migration of adhesive associated with the seals, which can contaminate the porous structure.

These and other features of the disclosure can be best understood from the following specification and drawings, the following of which is a brief description.

DETAILED DESCRIPTION

Figure 1:
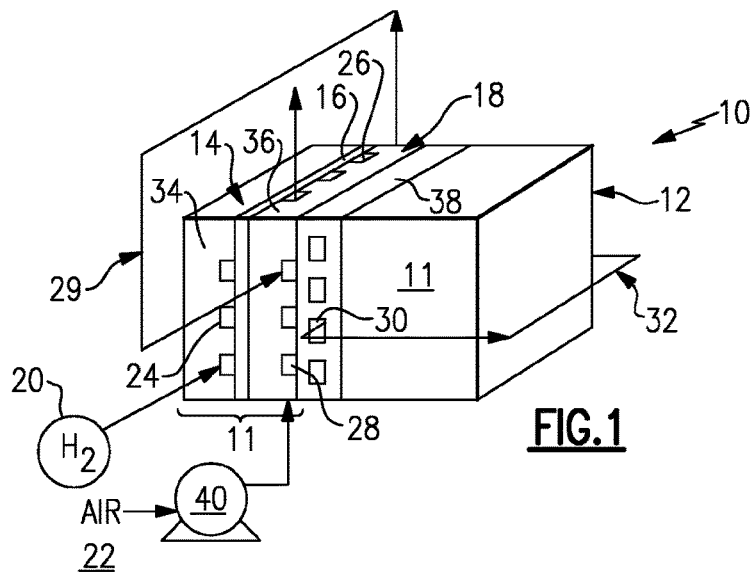
FIG. 1 is a schematic perspective view of an exemplary fuel cell.
Figure 2:
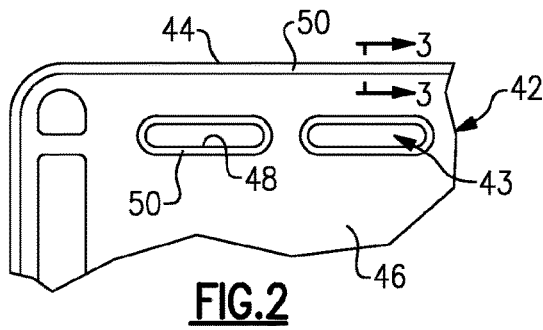
FIG. 2 is a partial elevational view of a porous structure prior to processing, in accordance with an embodiment.

A highly schematic view of a fuel cell 10 is shown in FIG. 1, in accordance with an embodiment of this disclosure. The fuel cell 10 includes multiple cells 11 that provide a cell stack assembly 12. Each cell 11 includes an electrode assembly 16 arranged between an anode 14 and a cathode 18, respectively provided by an anode plate 34 and a cathode plate 36. In one example, the electrode assembly 16 includes a proton exchange membrane and gas diffusion layers. Each anode plate 34 includes a fuel flow field 24, provided by channels in the anode plate 34 that are in fluid communication with a fuel source 20. The fuel source 20 is hydrogen, in one example. The cathode plate 36 provides a reactant flow field 26, provided by channels in the cathode plate 36 that are in fluid communication with an oxidant or reactant source 22. In one example, the oxidant is provided by air supplied by a pump 40.

Each cell 11 typically includes a coolant flow field 30 that may be provided by a separate structure, such as coolant plate 38, or integrated into one of the components of the cell 11. For integrated structures, the cathode plate 36 includes a water flow field 28 that transports product water along a circulating loop 29, which product water can also be used as a coolant. When using a separate structure, the coolant flow field 30 may include a coolant loop 32 for 15 circulating coolant within the cell stack assembly 12 to maintain the fuel cell 10 at or below a desired operating temperature. In other embodiments, a hybrid of both separate and integrated coolant structures can be used in a fuel cell.

In the example fuel cell 10, the anode plate 34 and cathode plate 36 are porous structures that permit water to be transported through the plates as well as fuel and reactant. The porous structure, indicated at 42 in FIGS. 2-5, must be sealed to prevent undesired leakage of gases from the anode and cathode plates 34, 36. In some fuel cell configurations, external manifolds are arranged about the perimeter of the plates and sealed to the plates using a gasket material. In other fuel cell configurations, it is desirable to use an internal manifold 43, which is contained within a perimeter 44 of the porous structure 42.

The porous structure 42 includes multiple features provided by a perimeter 44, opposing faces 46, edges 48 that define internal passages and recesses 50 that are configured to receive seals or gaskets. At least one of the faces 46 includes channels 52 that provide flow fields in communication with the manifolds 43.

It is desirable to contain the fluids, comprising gases and water, within the porous structure 42. To this end, one or more of the surfaces of the porous structure 42 are selectively processed to produce non-porous regions that prevent the leakage of gases and/or water. In one example, one or more of the surfaces of the porous structure 42 are treated by depositing carbon on the surfaces using a chemical vapor deposition (CVD) process to densify the exposed surfaces. In one example, the porous structure 42 is placed in a chamber with a carbon-rich environment, which can be provided by methane gas. The temperature and flow rate of the methane gas is configured to evolve carbon from the gas, which is deposited onto the exposed surfaces. The porous structure 42 can be unmasked, as illustrated by the process depicted in FIGS. 2-5 or masked to selective densify the porous structure 42, as depicted in FIG. 6.

Figure 3:
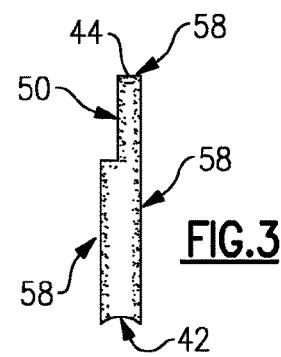
FIG. 3 is a partial cross-sectional view taken along line 3-3 in FIG. 2 during processing to produce a non-porous, densified region.
Figure 4:
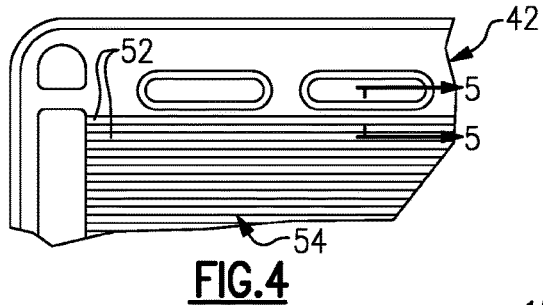
FIG. 4 is a partial elevational view of the porous structure shown in FIG. 2 during processing subsequent to densification.
Figure 5:
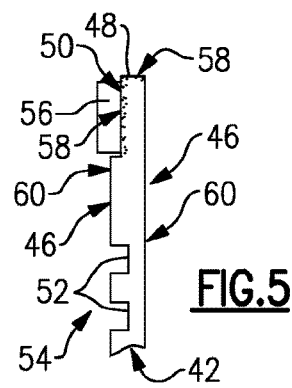
FIG. 5 is a partial cross-sectional view taken along line 5-5 of FIG. 4 subsequent to machining and with a seal installed.

Referring to FIGS. 2-5, the porous structure 42 is processed to produce one or more non-porous regions 58, such as by a CVD process. The non-porous region 58 has a porosity that is less that the porous structure 42. In one example, the non-porous region 58 is solid. The exposed surfaces, which in the example include the perimeter 44, opposing faces 46, edge 48 and recess 50, are densified as shown in FIG. 3. Next, channels 52 for a flow field 54 are machined into a face 46 to expose the porous structure 42 on a machined surface 60, shown in FIG. 4, which enables the flow of fluid through the porous structure 42 as desired. Other features can be provided on the machined surface 60 as well. In the example, the perimeter 44, edge 48 and recess 50 remain non-porous, preventing fluid leaks at those sites. Thus, an internal manifold 43 can be used without fluid leaking from the cell stack assembly 12. A seal 56 is applied to the recess 50, which, since it has been densified, no longer permits migration of adhesive into the porous structure 42.

Figure 6:
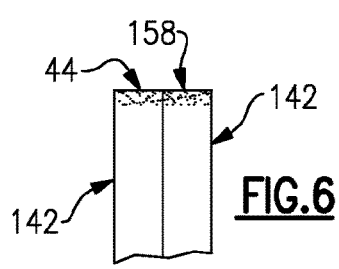
FIG. 6 is a partial cross-sectional view of two porous structures with non-porous, densified regions.

Referring to FIG. 6, porous structures 142 are arranged adjacent to one another and used to mask surfaces for which densification is desired. In the example, the porous structures 142 are assembled with the perimeters 44 exposed. The perimeters 44 are densified, for example, using a CVD process. In this manner, fluid is prevented from leaking out of the cell stack assembly 12 at the perimeter 44.

Although example embodiments have been disclosed, a worker of ordinary skill in this art would recognize that certain modifications would come within the scope of the claims. For that reason, the following claims should be studied to determine their true scope and content.

The invention claimed is:

1. A fuel cell component for a fuel cell comprising a gas diffusion layer and the fuel cell component, the gas diffusion layer being separate and distinct from the fuel cell component, the fuel cell component comprising:
an electrode plate including a porous region having a first porosity and a non-porous region having a second porosity less than the first porosity, wherein the non-porous region includes carbon and is provided in a seal recess that forms a perimeter around the electrode plate to receive an interfacial seal, the seal recess formed in one of opposing sides of the electrode plate, and wherein the electrode plate is one of an anode porous plate and a cathode porous plate and includes a plurality of reactant channels formed on one of the opposing sides that extend only partially through a thickness of the electrode plate to provide a reactant flow field that is perpendicular to a stack direction of the fuel cell, which plurality of reactant channels are configured to be in direct fluid communication with an oxidant source or a fuel source of the fuel cell, and a plurality of coolant channels formed on the other one of the opposing sides of the electrode plate that extend only partially through the thickness of the electrode plate to provide a coolant flow field that is perpendicular to the stack direction of the fuel cell.

2. The fuel cell component according to claim 1, wherein the electrode plate includes an internal manifold, and the perimeter is arranged outside of the internal manifold.

3. The fuel cell component of claim 1 wherein the electrode plate is a unitary structure.

4. The fuel cell component of claim 1 wherein the electrode plate is in direct contact with the gas diffusion layer.

5. The fuel cell component of claim 1 wherein the seal recess extends only partially through the electrode plate to define an interfacial seal receiving surface which mates with the interfacial seal.

6. The fuel cell component of claim 1 wherein the reactant channels extend in a plane of the electrode plate that is perpendicular to the thickness direction of the electrode plate to distribute oxidant or fuel across a planar area of the electrode plate.

7. The fuel cell component of claim 1 wherein the reactant channels have a depth that is less than the thickness of the electrode plate.

8. The fuel cell component of claim 1 wherein the plurality of coolant channels transport product water, which is used as a coolant within the fuel cell including the electrode plate.

9. The fuel cell component of claim 1 wherein a depth of the plurality of reactant channels is greater than a depth of the seal recess.

10. The fuel cell component of claim 1 wherein the electrode plate includes at least one internal manifold having a manifold recess extending around a perimeter thereof, and wherein a surface of the manifold recess is non-porous.

11. A fuel cell comprising:
an electrode assembly including a proton exchange membrane positioned between first and second gas diffusion layers;
a cathode plate adjacent the first gas diffusion layer opposite the proton exchange membrane; and
an anode plate adjacent the second gas diffusion layer opposite the proton exchange membrane, and
wherein at least one of the cathode plate and the anode plate is an electrode plate including a porous region having a first porosity and a non-porous region having a second porosity less than the first porosity, wherein the non-porous region includes carbon and is provided in a seal recess that forms a perimeter around the electrode plate to receive an interfacial seal, the seal recess formed in one of opposing sides of the electrode plate, and wherein the electrode plate includes a plurality of reactant channels formed in one of the opposing sides that extend only partially through a thickness of the electrode plate to provide a reactant flow field that is perpendicular to a stack direction of the fuel cell, which plurality of reactant channels are configured to be in direct fluid communication with an oxidant source or a fuel source of the fuel cell, and a plurality of coolant channels formed on the other one of the opposing sides of the electrode plate that extend only partially through the thickness of the electrode plate to provide a coolant flow field that is perpendicular to the stack direction of the fuel cell.

12. A fuel cell component comprising:
an electrode plate including a pair of opposing surfaces, a first one of the pair of opposing surfaces mating with a first gas diffusion layer of an electrode assembly wherein the first gas diffusion layer is separate and distinct from the electrode plate and the electrode assembly includes a proton exchange membrane between the first gas diffusion layer and a second gas diffusion layer opposite the first gas diffusion layer, the electrode plate having a porous internal structure with a first porosity and a non-porous exterior structure having a second porosity less than the first porosity, the non-porous exterior structure including the opposing surfaces, and wherein the non-porous exterior structure includes a seal recess that forms a perimeter around the electrode plate to receive an interfacial seal, the seal recess formed relative to a planar face of one of the pair of opposing surfaces of the electrode plate, and wherein the electrode plate is one of an anode porous plate and a cathode porous plate and includes a plurality of reactant channels formed in one of the pair of opposing surfaces of the electrode plate that extend only partially through a thickness of the electrode plate to provide a reactant flow field, the plurality of reactant channels form through the non-porous exterior structure on the one of the pair of opposing surfaces to expose the porous internal structure of the electrode plate, which reactant channels are configured to be in direct fluid communication with an oxidant source or a fuel source.

13. The fuel cell component of claim 12 wherein the plurality of reactant channels are formed relative to the planar face.

14. The fuel cell component of claim 12 wherein the plurality of reactant channels are substantially parallel to the seal recess.

15. The fuel cell component of claim 12 wherein the electrode plate includes an internal manifold extending through a portion of the seal recess.

16. The fuel cell component of claim 12 further comprising a coolant plate adjacent a second one of the pair of opposing surfaces and having a plurality of coolant channels extending through a thickness of the coolant plate.

17. A fuel cell component comprising:
an electrode plate including opposing surfaces, one of the opposing surfaces mating with a gas diffusion layer of an electrode assembly wherein the gas diffusion layer is separate and distinct from the electrode plate, the electrode plate having a porous internal structure with a first porosity and a non-porous exterior structure having a second porosity less than the first porosity, the non-porous exterior structure including the opposing surfaces, and wherein the electrode plate includes a plurality of reactant channels formed through the non-porous exterior structure on one of the opposing surfaces to expose the porous internal structure of the electrode plate and to provide a reactant flow field, which reactant channels are configured to be in fluid communication with an oxidant source or a fuel source.

18. The fuel cell component of claim 17 wherein the non-porous exterior structure surrounds the porous internal structure.

19. The fuel cell component of claim 17 wherein the non-porous exterior structure further comprises a seal recess that forms a perimeter around the fuel cell component to receive an interfacial seal, the seal recess formed in the same surface of the opposing surfaces as the plurality of reactant channels.

20. The fuel cell component of claim of claim 17 wherein the electrode plate includes at least one internal manifold having a manifold recess extending around a perimeter thereof, and wherein the non-porous exterior structure includes a surface of the manifold recess.

* * * * *